US 8,056,089 B2

(12) United States Patent
Fried et al.

(10) Patent No.: US 8,056,089 B2
(45) Date of Patent: Nov. 8, 2011

(54) SHORTCUT IP COMMUNICATIONS BETWEEN SOFTWARE ENTITIES IN A SINGLE OPERATING SYSTEM

(75) Inventors: Eric Fried, Austin, TX (US); Vinit Jain, Austin, TX (US); Lance W. Russell, Rosansky, TX (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 11/557,184

(22) Filed: Nov. 7, 2006

(65) Prior Publication Data
US 2008/0109818 A1 May 8, 2008

(51) Int. Cl.
*G06F 3/00* (2006.01)
*G06F 15/16* (2006.01)
(52) U.S. Cl. ......... 719/313; 719/312; 719/320; 709/218
(58) Field of Classification Search .................. None
See application file for complete search history.

(56) References Cited

U.S. PATENT DOCUMENTS

| 7,051,108 | B1* | 5/2006 | Jones et al. ................... 709/230 |
| 2006/0034290 | A1* | 2/2006 | Kalofonos et al. ......... 370/395.2 |
| 2006/0075123 | A1* | 4/2006 | Burr et al. ..................... 709/228 |
| 2006/0106934 | A1* | 5/2006 | Figaro et al. ................. 709/227 |

* cited by examiner

*Primary Examiner* — Lechi Truong
*Assistant Examiner* — Tuan Dao
(74) *Attorney, Agent, or Firm* — Dillon & Yudell LLP

(57) ABSTRACT

A method, computer program product, and data processing system for performing efficient communication between software entities residing in the same operating system using conventional network communications APIs are disclosed. According to a preferred embodiment, when a software entity (e.g., a process) attempts to communicate through a networking API, the operating system determines whether the other end of the communication refers to the same hardware node. If so, the operating system replaces the network protocol connection (socket connection) with a direct interprocess communication construct. The operating system provides additional code to simulate the appearance of an actual network (socket) connection at the API level while performing all actual I/O using the interprocess communication construct.

20 Claims, 4 Drawing Sheets

SHORTCUT IP COMMUNICATIONS BETWEEN SOFTWARE ENTITIES IN A SINGLE OPERATING SYSTEM

BACKGROUND OF THE INVENTION

1. Technical Field

The present invention relates generally to networked computer programming, and specifically to the improvement of execution performance of network applications communicating with each other in a single operating system.

2. Description of the Related Art

Modern telecommunications depends on networks. A network is a set of interconnected machines (network elements) that allow data to be relayed across the set of machines from a source to a destination. Networks may be classified according to the geographic area they occupy. A local area network (LAN) is usually defined as a network that is physically limited to a relatively small area, such as a building or group of buildings. A wide area network (WAN) is a general term for a network of larger size.

Networking protocols, which define the rules for communication between network elements, are typically designed to work in layers, where each layer performs a slightly different role in data transmission. TCP/IP (Transmission Control Protocol/Internet Protocol) is a collection of protocols (called a protocol suite) that forms the basis for the Internet and many other networks. TCP/IP is generally considered to follow a four-layer protocol model.

An application programmer needing to write networking-enabled software typically uses an application programming interface (API) that allows the programmer to program network communications in an abstract way without explicitly addressing the specifics of each protocol layer. Perhaps the most widely utilized of such APIs is the "sockets" API commonly provided in UNIX/POSIX-based operating systems; similar "sockets" and "sockets"-like APIs are provided in other operating systems and programming environments, such as the JAVA programming environment, for example. The "sockets" approach to network communication is to model a connection between two network entities as a stream or abstract file, which is called a "socket". In the usual POSIX "sockets" library for use in programming in the C programming language, opening a socket generates a "socket descriptor" number, which is analogous to a file descriptor. Subsequent input/output (I/O) from/to the socket is performed by passing the "socket descriptor" to I/O routines, just as in the case of a file descriptor.

Although it is arguable that the ultimate aim of network programming is to allow various computers in a network to communicate with one another, it often occurs that two communicating network applications will actually reside on the same computer and same operating system instance. For example, an application server process may communicate with a database server process on the same operating system instance. In such cases, a modern operating system will generally avoid using the computer's networking hardware to enable the communication, but will still process the communication through the usual protocol layers (e.g., the layers of the TCP/IP protocol suite). The usefulness of the processing performed by these layers, however, is of less value for communication between software entities on the same system. For instance, encryption of data being transmitted between two processes on the same system is superfluous.

In existing technology, however, there is no way to bypass this additional network processing without including additional (non-standard) code in each application to enable this type of bypass when applicable. Moreover, this type of bypass cannot be used in a partitioned system, i.e., a system that is divided into two or more software partitions. Software partitions are virtual operating system instances residing on the same physical system and sharing the same operating system (kernel) code. A software partition cannot see certain aspects the global environment and other software partitions (including network-related information), except as they would be visible from a physically separate system. Thus, in the event that communicating applications resided in separate software partitions on one global system, the applications would not be capable of determining that they existed on the same system and would therefore not be able to bypass the full network protocol processing using the technique described above.

What is needed, therefore, is a method of bypassing full protocol stack processing for communications between two processes residing on the same system, even in the event that the two processes reside in different software partitions or under other circumstances that prevent the applications themselves from determining whether they reside on the same system. The present invention provides a solution to this and other problems, and offers other advantages over previous solutions.

SUMMARY OF THE INVENTION

Accordingly, the present invention provides a method, computer program product, and data processing system for performing efficient communication between software entities residing in the same operating system using conventional network communications APIs. According to a preferred embodiment, when a software entity (e.g., a process) attempts to communicate through a networking API, the operating system determines whether the other end of the communication refers to the same hardware node. If so, the operating system replaces the network protocol connection (socket connection) with a direct interprocess communication construct. The operating system provides additional code to simulate the appearance of an actual network (socket) connection at the API level while performing all actual I/O using the interprocess communication construct.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
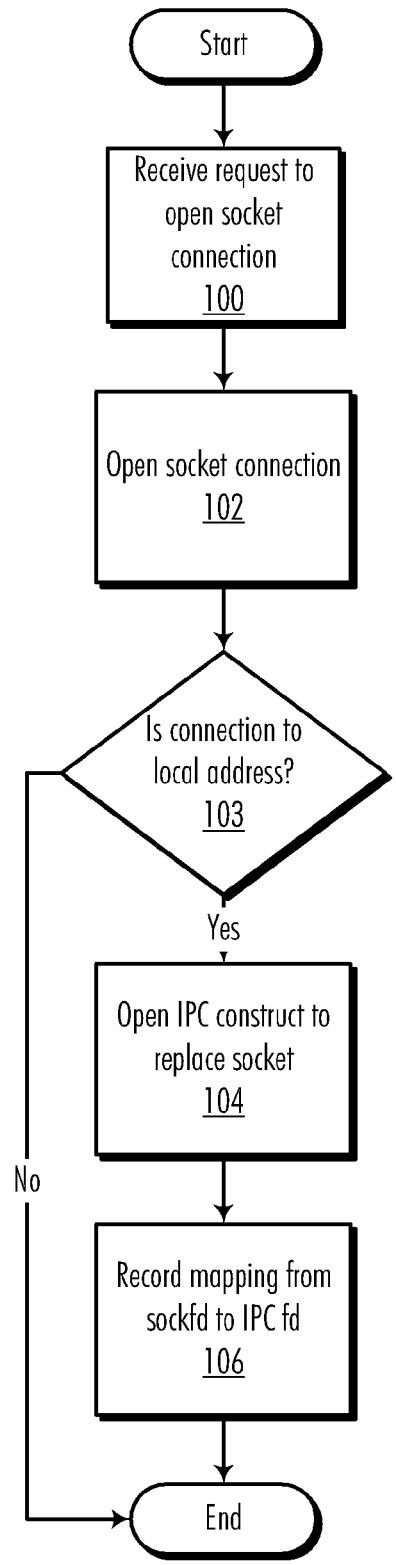
FIG. 1 is a flowchart representation of a process of opening a network connection in an operating system in accordance with a preferred embodiment of the present invention.

FIG. 1 is a flowchart representation of a process of opening a network connection in an operating system in accordance with a preferred embodiment of the present invention. The process begins with the operating system receiving a request to open a network connection (via a call to the appropriate routine in the sockets API or other suitable networking API-one skilled in the art will recognize that the example provided in FIG. 1 utilizes the sockets API, but other similar APIs, such as the X/Open Transport Interface or "XTI," may be used without limitation) (block 100). In response to this call, the operating system first naively complies with the request by opening a normal network connection (e.g., a socket connection) (block 102).

Next, however, a determination is made as to whether the address on the other end of the connection (the "destination node") is actually a local address (i.e., that the connection is to a software entity residing in the same operating system on the same hardware node) (block 103). This determination is made by consulting the operating system's internal routing table, which indicates which network interface is used to transmit packets to the destination node. If the destination node is a local address, a physical network interface is not used transmit/receive packets to/from the destination node; rather a fictitious or "virtual" interface, known as the "loopback interface," is used instead. The loopback interface is a software-defined construct that simply sends packets to itself, rather than through a hardware network adapter. In a typical TCP/IP networking system, the loopback interface is assigned the IP address 127.0.0.1 by convention.

In a preferred embodiment of the present invention, the operating system kernel provides a service for determining the route taken by packets through a given network connection and returning that route to the calling routine. Thus, the destination node for a given network connection is determined to be local by first querying this route lookup kernel service, then determining if the returned route is a route through the loopback interface. If the route goes through the loopback interface, then the destination node is a local address.

If the destination node is not local (block 103:No), then the process of opening the connection simply terminates. If the destination node is local, however (block 103:Yes), then the operating system generates an interprocess communication (IPC) construct to replace the conventional network connection (socket connection) (block 104).

It should be noted that in this context, the terms "interprocess communication" and "IPC" are used in a broad sense to incorporate any of a number of different operating system constructs used for facilitating communication between software entities (e.g., processes and threads) in a multitasking operating system, notwithstanding the fact that some operating systems (most notably, UNIX System V and related operating systems) use the term IPC to refer to a specific type of interprocess communication construct. The terms "interprocess communication" and "IPC," as used here, encompass other types of operating system constructs, such as pipes, FIFOs (First-In-First-Out), and the like. Indeed, these other types of constructs, many of which follow a stream-like model input/output, are actually preferred over the messaging and shared memory communications constructs provided by "System V IPC".

In particular a preferred embodiment of the present invention replaces the local network connection with a stream-like interprocess communication construct. A number of such constructs are widely known in the art. POSIX-compliant operating systems define a bidirectional "FIFO" construct, which provides stream-based I/O between processes. POSIX-based operating systems also provide a feature called "pipes," which provide similar stream-based I/O. The POSIX standard defines only half-duplex pipes, however, so it is necessary in some operating systems to utilize a pair of pipes for full-duplex communications (although some operating systems, such as UNIX System V Release 4, support bidirectional pipes or, as in the case of the open-source Linux operating system, paired half-duplex pipes).

Another form of interprocess communication construct that may be utilized is that of "operating system-domain sockets" or "local domain sockets" (commonly referred to as "UNIX domain sockets" in the UNIX/POSIX community). These are interprocess communication constructs (i.e., they do not allow for communication over a network interface) that utilize the same API as network sockets, but that are bound to a pathname (i.e., filename) rather than to a network address.

Figure 2:
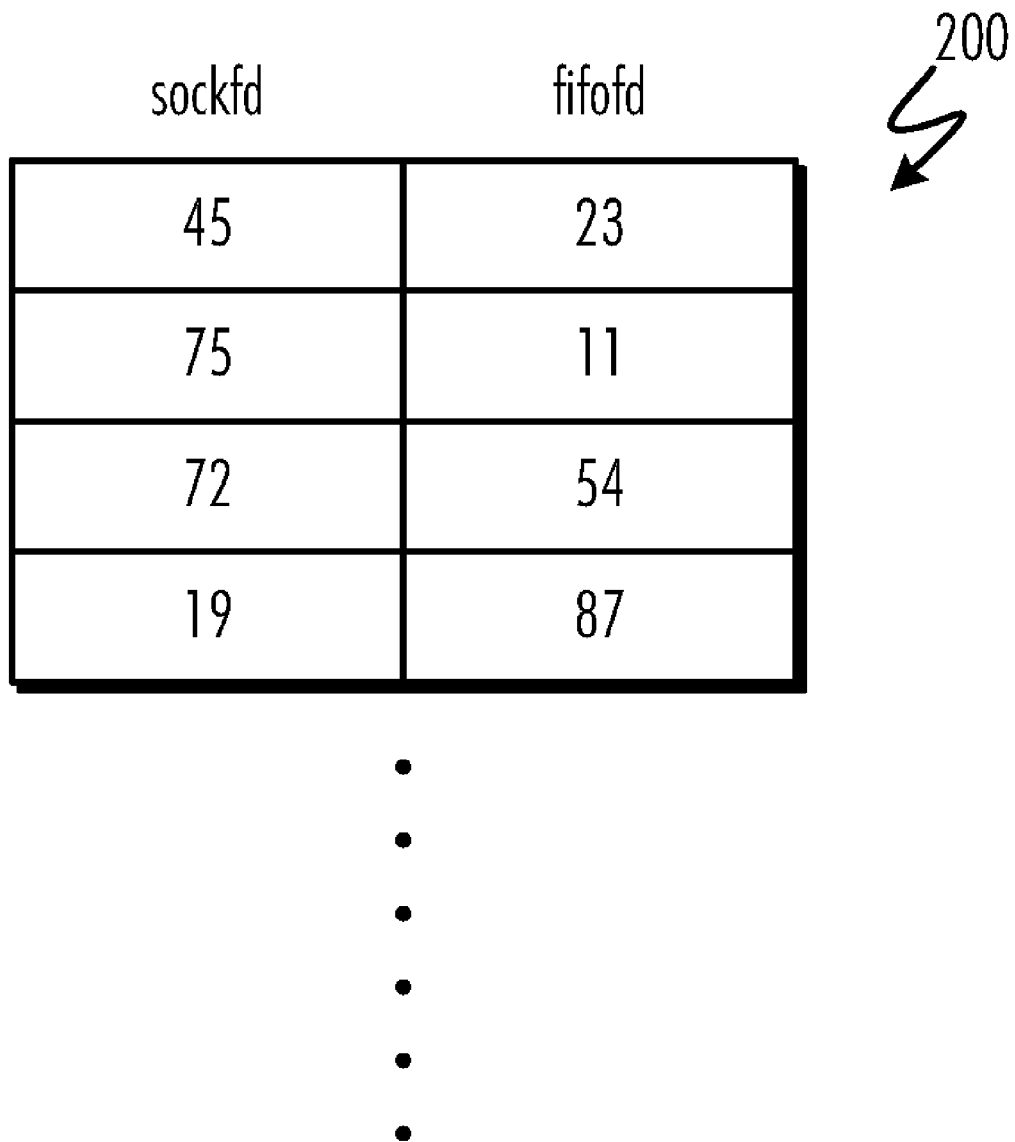
FIG. 2 is a diagram of a socket descriptor/IPC construct descriptor mapping table in accordance with a preferred embodiment of the present invention.

Once the interprocess communication construct has been created, an entry is made in a mapping table to denote a mapping from the original network connection to the new interprocess communication construct (block 106). In a preferred embodiment implemented in a POSIX-like operating system, both network sockets and stream-based IPC constructs are assigned to numerical "descriptor values," which function like file descriptors. Thus, a mapping table to map network connections to associated IPC constructs may be constructed in the form of table 200 in FIG. 2, where numerical socket descriptors (sockfd) are mapped into IPC construct descriptors, which in this example are bidirectional FIFOs (fifofd). Once this mapping is complete, all input/output can be performed through the IPC construct in the manner shown in FIG. 3. At this point, it is actually possible to close or destroy the original network connection (generated at block 102), as long as this is done in a manner that is undetectable by the applications on either end of the connection. In any case, the process of responding to the connection request is complete and control may be returned to the calling application.

One skilled in the art will recognize that in an alternative embodiment of the present invention, the original socket connection need not actually be established before creating the interprocess communication construct. If it can be determined initially that the destination node is local without creating a socket connection, then the interprocess communication construct can be created to begin with, without opening a socket connection at all.

Figure 3:
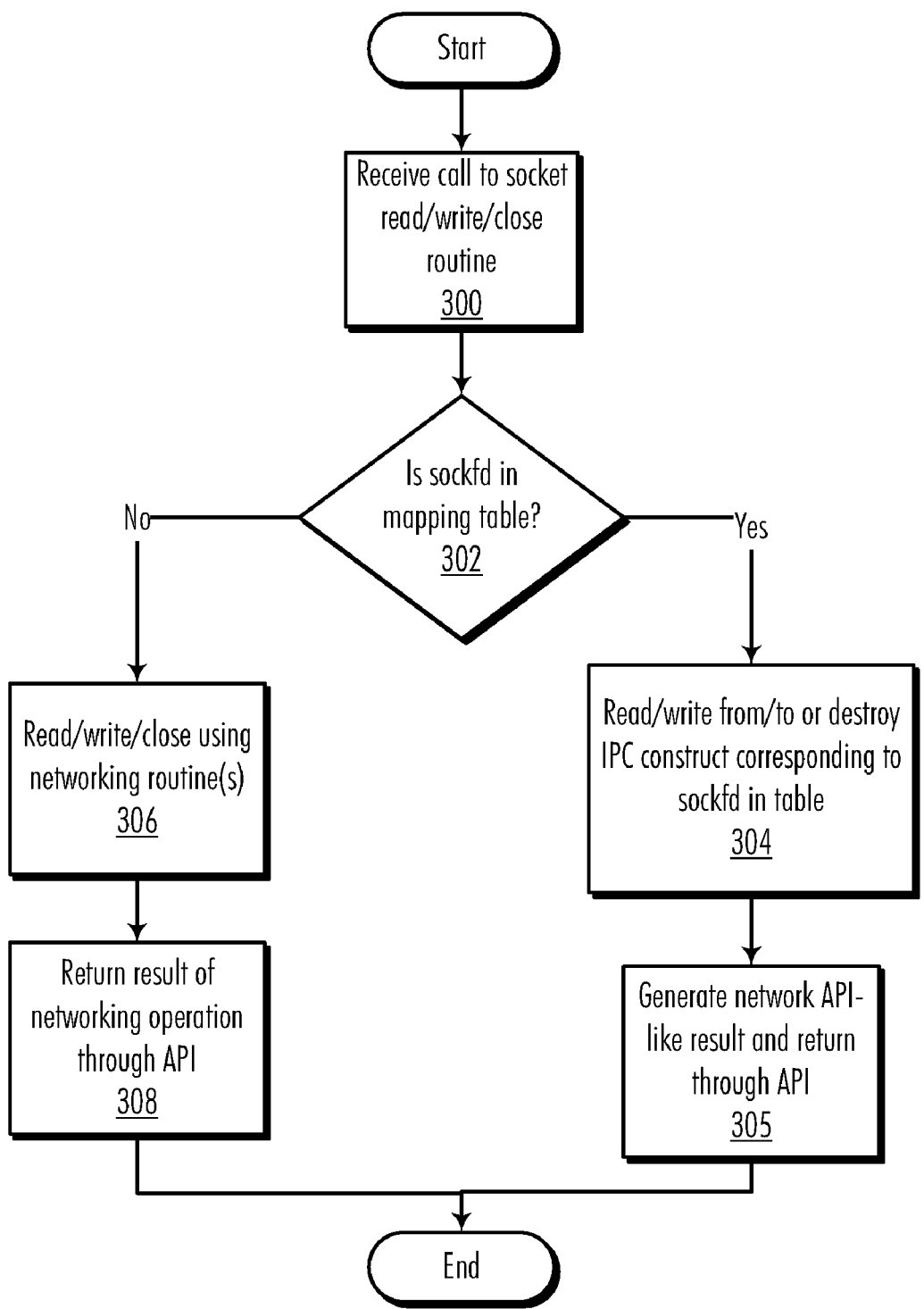
FIG. 3 is a diagram of a process of reading from, writing to, querying, or destroying a network connection in accordance with a preferred embodiment of the present invention.

FIG. 3 is a diagram of a process of reading from, writing to, querying, or destroying a network connection in accordance with a preferred embodiment of the present invention. A call is received by the operating system to read, write, query, or close a connection made in accordance with the process shown in FIG. 1 (block 300). The operating system then determines if the socket descriptor (or other form of handle used to identify the connection) can be found in the mapping table (table 200 in FIG. 2). If, so, then whatever operation would have been performed on that connection's socket (reading, writing, querying status, closing, etc.) is performed instead on the IPC construct associated with the socket descriptor in the mapping table (block 304). The result of this operation is then placed in the usual form of output for the API in which the call was initially received and this result is returned through that API (block 305). In some instances, it may be necessary to generate spurious information to return through the API to maintain compatibility with the original API specification, where the information normally returned API is not applicable to the IPC construct. At this point, control returns to the calling application.

As can be seen, the processes of FIGS. 1 and 3 provide an application-independent method of improving the performance of network applications in a single operating system that must communicate with one another. This method is completely transparent to the applications, as it is performed by the operating system through normal network system calls.

Figure 4:
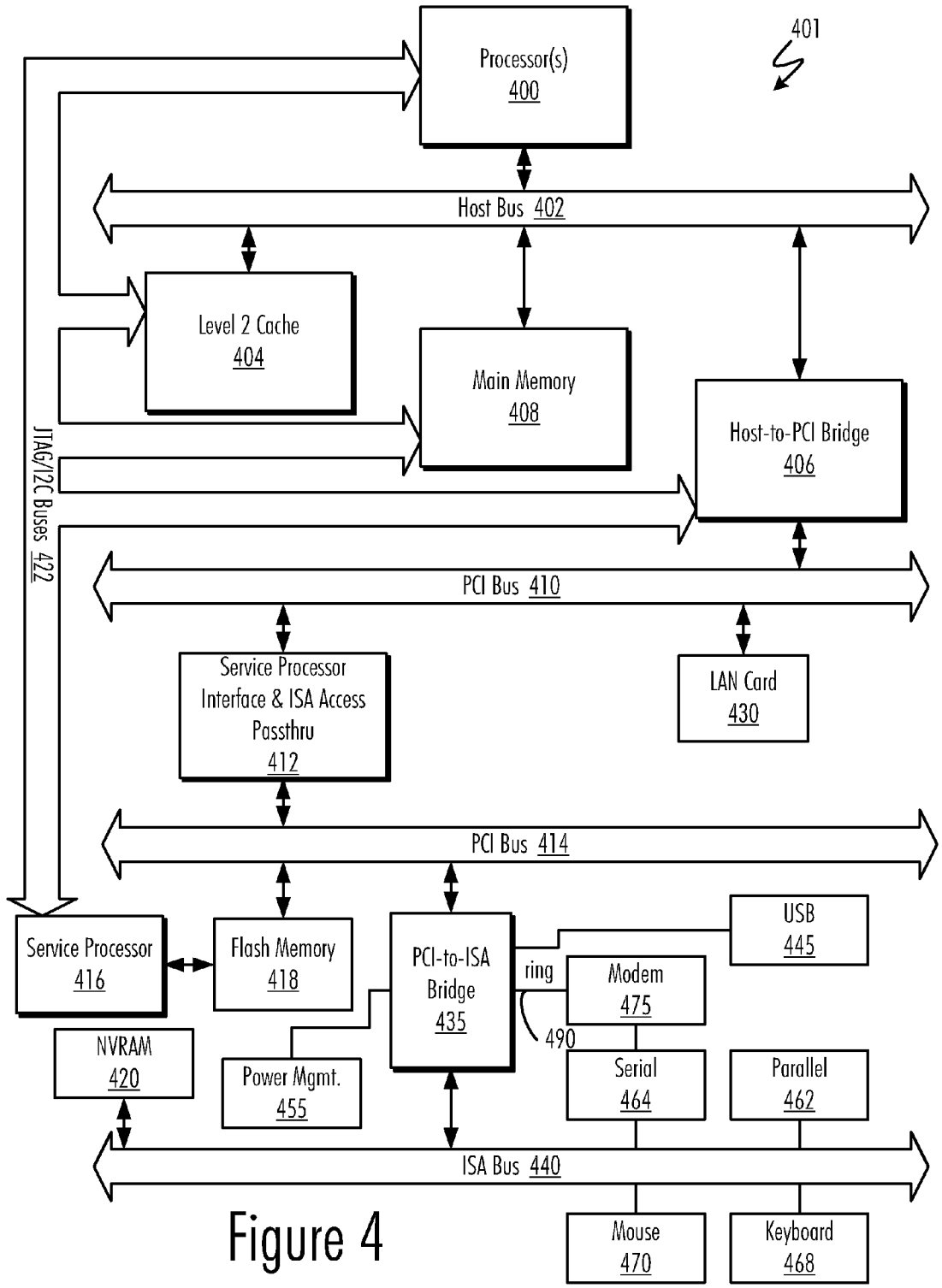
FIG. 4 is a block diagram of a data processing system in which a preferred embodiment of the present invention may be implemented.

FIG. 4 illustrates information handling system 401 which is a simplified example of a computer system/data processing system capable of performing the computing operations described herein with respect to a preferred embodiment of the present invention. Computer system 401 includes processor 400 which is coupled to host bus 402. A level two (L2) cache memory 404 is also coupled to host bus 402. Host-to-PCI bridge 406 is coupled to main memory 408, includes cache memory and main memory control functions, and provides bus control to handle transfers among PCI bus 410, processor 400, L2 cache 404, main memory 408, and host bus 402. Main memory 408 is coupled to Host-to-PCI bridge 406 as well as host bus 402. Devices used solely by host processor(s) 400, such as LAN card 430, are coupled to PCI bus 410. Service Processor Interface and ISA Access Pass-through 412 provides an interface between PCI bus 410 and PCI bus 414. In this manner, PCI bus 414 is insulated from PCI bus 410. Devices, such as flash memory 418, are coupled to PCI bus 414. In one implementation, flash memory 418 includes BIOS code that incorporates the necessary processor executable code for a variety of low-level system functions and system boot functions.

PCI bus 414 provides an interface for a variety of devices that are shared by host processor(s) 400 and Service Processor 416 including, for example, flash memory 418. PCI-to-ISA bridge 435 provides bus control to handle transfers between PCI bus 414 and ISA bus 440, universal serial bus (USB) functionality 445, power management functionality 455, and can include other functional elements not shown, such as a real-time clock (RTC), DMA control, interrupt support, and system management bus support. Nonvolatile RAM 420 is attached to ISA Bus 440. Service Processor 416 includes JTAG and I2C buses 422 for communication with processor(s) 400 during initialization steps. JTAG/I2C buses 422 are also coupled to L2 cache 404, Host-to-PCI bridge 406, and main memory 408 providing a communications path between the processor, the Service Processor, the L2 cache, the Host-to-PCI bridge, and the main memory. Service Processor 416 also has access to system power resources for powering down information handling device 401.

Peripheral devices and input/output (I/O) devices can be attached to various interfaces (e.g., parallel interface 462, serial interface 464, keyboard interface 468, and mouse interface 470 coupled to ISA bus 440. Alternatively, many I/O devices can be accommodated by a super I/O controller (not shown) attached to ISA bus 440.

In order to attach computer system 401 to another computer system to copy files over a network, LAN card 430 is coupled to PCI bus 410. Similarly, to connect computer system 401 to an ISP to connect to the Internet using a telephone line connection, modem 475 is connected to serial port 464 and PCI-to-ISA Bridge 435.

While the computer system described in FIG. 4 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. In a data processing system having one or more operating systems (OS) and a plurality of software entities executing thereon, a processor implemented method comprising:

an operating system of the one or more operating systems receiving a request from an originating software entity to open a network connection via a call to a routine in a networking/sockets application programming interface (API);

the operating system determining from an internal routing table whether a destination address of a destination node of the request is a local address, wherein the local address is the local address of a software entity in the operating system on a same physical device as the originating software entity from which the request was generated;

in response to determining the destination address of the destination node is a local address, the operating system generating an interprocess communication (IPC) construct within the operating system to replace a conventional network/socket connection between the originating software entity and a destination software entity;

wherein the destination address is determined to be local when the destination address points to a location of the destination software entity when the destination software entity exists within a same OS and on the same physical device as the originating software entity, and when the originating software entity and the destination software entity exists within separate software partitions on the same OS and the same physical device; and in response to the destination address being a local address, utilizing a loopback interface to transmit/receive packets to/from the destination node in lieu of a local network interface indicated by the conventional network/socket connection.

2. The method of claim 1, wherein the determining whether the address of the destination node is a local address further comprises:

determining if a location of the destination node for a given network connection is local by:
(a) querying a route lookup kernel service; and (b) determining if a return route is a route through the loopback interface; wherein the destination node is a local address when the route goes through the loopback interface; or
(c) consulting an internal routing table of the OS; and wherein the location is determined to be local when the originating software entity exists within a same OS and on the same physical device, and when the originating software entity and the destination node exists within separate software partitions on a same OS and a same physical device.

3. The method of claim 1, wherein when the destination node is local, the method further comprises:

replacing a conventional network/socket connection in an internal routing table of the OS with the IPC construct; and wherein the destination node is determined to be local when the originating software entity exists within a same OS and on the same physical device, and when the originating software entity and the destination node exists within two separate software partitions, which share a same OS on a same physical device.

4. The method of claim 3, wherein the IPC construct generated is a streamlike IPC such as a pipe or a FIFO structure, which provides stream-like model input/output.

5. The method of claim 3, wherein said replacing the conventional network/socket connection in the internal routing table comprises:

creating a mapping table to map network connections to associated IPC construct, wherein numerical socket descriptors are mapped into IPC construct descriptors in a bidirectional First-In-First-Out (FIFO);

making an entry in the mapping table to denote a mapping from an original network connection to a new IPC construct;

assigning a network socket and a stream-based IPC construct with numerical descriptor values, which values function as file descriptors; and subsequently performing all input/output through the stream-based IPC construct.

6. The method of claim 5, further comprising destroying an original network connection after the mapping is created within the mapping table.

7. The method of claim 5, further comprising:

the operating system receiving a call to perform a function on a network connection, wherein the function is one or more from among reading from, writing to, querying or destroying the network connection;

determining if a socket descriptor can be found in the mapping table;

if the socket descriptor is found in the mapping table, performing one or more operations intended to be performed by a connections' socket on the IPC construct associated with the socket descriptor in the mapping table;

placing a result of the one or more operations in a usual form of output for the API in which the call was initially received;

returning the result through the API; and returning control to the calling application.

8. The method of claim 1, further comprising creating the IPC construct without first creating a socket connection when a prior determination is made that the destination node is local.

9. A data processing system comprising:

at least one processor;

data storage accessible to the at least one processor;

an operating system (OS) and a plurality of software entities also executing on the processor; and program code that is executed by the processor to provide the functions of:

the operating system receiving a request from an originating software entity to open a network connection via a call to a routine in a networking/sockets application programming interface (API);

the operating system determining from an internal routing table whether a destination address of a destination node of the request is a local address, wherein the local address is the local address of a software entity in the operating system on a same physical device as the originating software entity from which the request was generated;

in response to determining the destination address of the destination node is a local address, the operating system generating an interprocess communication (IPC) construct within the operating system to replace a conventional network/socket connection between the originating software entity and a destination software entity;

wherein the address is determined to be local when the address points to a location of a destination software entity that exists within the same OS and on the same physical device as the originating software entity, and when the originating software entity and the destination software entity exists within separate software partitions on the same OS and the same physical device; and in response to the address being a local address, utilizing a loopback interface to transmit/receive packets to/from the destination node in lieu of a local network interface indicated by the conventional network/socket connection.

10. The data processing system of claim 9, wherein the program code for determining whether the address of the destination node is a local address further comprises code that performs the functions of:
   determining if a location of the destination node for a given network connection is local by:
      (a) querying a route lookup kernel service; and (b) determining if a return route is a route through the loopback interface; wherein the destination node is a local address when the route goes through the loopback interface; or
      (c) consulting an internal routing table of the OS; and
   wherein the location is determined to be local when the originating software entity exists within a same OS and on the same physical device, and when the originating software entity and the destination node exists within separate software partitions on a same OS and a same physical device.

11. The data processing system of claim 10, wherein said program code for replacing the conventional network/socket connection in the internal routing table comprises code that performs the functions of:
   creating a mapping table to map network connections to associated IPC construct, wherein numerical socket descriptors are mapped into IPC construct descriptors in a bidirectional First-In-First-Out (FIFO);
   making an entry in the mapping table to denote a mapping from an original network connection to a new IPC construct;
   assigning a network socket and a stream-based IPC construct with numerical descriptor values, which values function as file descriptors; and
   subsequently performing all input/output through the stream-based IPC construct.

12. The data processing system of claim 11, further comprising program code that performs the functions of:
   creating the IPC construct without first creating a socket connection when a prior determination is made that the destination node is local; and
   destroying an original network/socket connection after the mapping is created within the mapping table.

13. The data processing system of claim 11, further comprising:
   the operating system receiving a call to perform a function on a network connection, wherein the function is one or more from among reading from, writing to, querying or destroying the network connection;
   determining if a socket descriptor can be found in the mapping table;
   if the socket descriptor is found in the mapping table, performing one or more operations intended to be performed by a connections' socket on the IPC construct associated with the socket descriptor in the mapping table;
   placing a result of the one or more operations in a usual form of output for the API in which the call was initially received;
   returning the result through the API; and
   returning control to the calling application.

14. The data processing system of claim 9, wherein when the destination node is local, the program code further comprises code that performs the functions of:
   wherein the IPC construct generated is a streamlike IPC such as a pipe or a First-In-First-Out (FIFO) structure, which provides stream-like model input/output; and
   replacing a conventional network/socket connection in an internal routing table of the OS with the IPC construct;
   wherein the destination node is determined to be local when the originating software entity exists within a same OS and on the same physical device, and when the originating software entity and the destination node exists within two separate software partitions, which share a same OS on a same physical device.

15. A computer program product comprising a computer-readable storage medium and program code stored on the computer readable storage medium that, when executed by a data processing system with a single operating system (OS) supporting a plurality of software entities, causes the data processing system to perform the functions of:
   the operating system receiving a request from an originating software entity to open a network connection via a call to a routine in a networking/sockets application programming interface (API);
   the operating system determining from an internal routing table whether a destination address of a destination node of the request is a local address, wherein the local address is the local address of a software entity in the operating system on a same physical device as the originating software entity from which the request was generated;
   in response to determining the destination address of the destination node is a local address, the operating system generating an interprocess communication (IPC) construct within the operating system to replace a conventional network/socket connection between the originating software entity and a destination software entity;
   wherein the address is determined to be local when the address points to a location of a destination software entity that exists within the same OS and on the same physical device as the originating software entity, and when the originating software entity and the destination software entity exists within separate software partitions on the same OS and the same physical device; and
   in response to the address being a local address, utilizing a loopback interface to transmit/receive packets to/from the destination node in lieu of a local network interface indicated by the conventional network/socket connection.

16. The computer program product of claim 15, wherein the program code for determining whether the address of the destination node is a local address further comprises code that causes the data processing system to perform the functions of:
   determining if a location of the destination node for a given network connection is local by:
      (a) querying a route lookup kernel service; and (b) determining if a return route is a route through the loopback interface; wherein the destination node is a local address when the route goes through the loopback interface; or
      (c) consulting an internal routing table of the OS; and
   wherein the location is determined to be local when the originating software entity exists within a same OS and on the same physical device, and when the originating software entity and the destination node exists within separate software partitions, which share a same OS and a same physical device.

17. The computer program product of claim 16, further comprising:
   the operating system receiving a call to perform a function on a network connection, wherein the function is one or more from among reading from, writing to, querying or destroying the network connection;
   determining if a socket descriptor can be found in the mapping table;

if the socket descriptor is found in the mapping table, performing one or more operations intended to be performed by a connections' socket on the IPC construct associated with the socket descriptor in the mapping table;

placing a result of the one or more operations in a usual form of output for the API in which the call was initially received;

returning the result through the API; and returning control to the calling application.

18. The computer program product of claim 15, wherein when the destination node is local, the program code further comprises code that causes the data processing to perform the functions of:

replacing a conventional network/socket connection in an internal routing table of the OS with the IPC construct;

wherein the IPC construct generated is a streamlike IPC such as a pipe or a First-In-First-Out (FIFO) structure, which provides stream-like model input/output; and wherein the destination node is determined to be local when the originating software entity exists within a same OS and on the same physical device, and when the originating software entity and the destination node exists within two separate software partitions, which share a same OS on a same physical device.

19. The computer program product of claim 18, wherein said program code for replacing the conventional network/socket connection in the internal routing table comprises code that performs the functions of:

creating a mapping table to map network connections to associated IPC construct, wherein numerical socket descriptors are mapped into IPC construct descriptors in a bidirectional FIFO;

making an entry in the mapping table to denote a mapping from an original network connection to a new IPC construct;

assigning a network socket and a stream-based IPC construct with numerical descriptor values, which values function as file descriptors; and subsequently performing all input/output through the stream-based IPC construct.

20. The computer program product of claim 19, further comprising program code that performs the functions of:

creating the IPC construct without first creating a socket connection when a prior determination is made that the destination node is local; and destroying an original network/socket connection after the mapping is created within the mapping table.

* * * * *